(12) United States Patent
Pope

(10) Patent No.: US 10,419,318 B2
(45) Date of Patent: Sep. 17, 2019

(54) DETERMINING ATTRIBUTES USING CAPTURED NETWORK PROBE DATA IN A WIRELESS COMMUNICATIONS SYSTEM

(71) Applicant: AT&T Intellectual Property I, L.P., Atlanta, GA (US)

(72) Inventor: James Keith Pope, Tampa, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 220 days.

(21) Appl. No.: 15/432,367

(22) Filed: Feb. 14, 2017

(65) Prior Publication Data
US 2018/0234323 A1    Aug. 16, 2018

(51) Int. Cl.
| | |
|---|---|
| *H04L 1/00* | (2006.01) |
| *H04L 12/26* | (2006.01) |
| *H04W 12/08* | (2009.01) |
| *H04L 29/06* | (2006.01) |
| *H04W 12/12* | (2009.01) |
| *H04W 84/12* | (2009.01) |
| *H04W 48/14* | (2009.01) |
| *H04W 12/00* | (2009.01) |

(52) U.S. Cl.
CPC .......... *H04L 43/10* (2013.01); *H04L 63/1408* (2013.01); *H04W 12/08* (2013.01); *H04W 12/1208* (2019.01); *H04W 12/00505* (2019.01); *H04W 48/14* (2013.01); *H04W 84/12* (2013.01)

(58) Field of Classification Search
None
See application file for complete search history.

(56) References Cited

U.S. PATENT DOCUMENTS

| | | |
|---|---|---|
| 7,346,338 B1 | 3/2008 | Calhoun et al. |
| 8,116,287 B2 | 2/2012 | Krantz et al. |
| 8,707,432 B1 | 4/2014 | Rathi et al. |
| 8,782,740 B1 | 7/2014 | Sarra et al. |
| 8,938,785 B2 | 1/2015 | Chen et al. |
| 9,027,106 B2 | 5/2015 | Yu |
| 9,137,670 B2 | 9/2015 | Gray |
| 9,295,022 B2 | 3/2016 | Markowitz et al. |
| 9,467,932 B2 | 10/2016 | Xiang |
| 9,503,463 B2 | 11/2016 | Karta et al. |
| 2008/0198823 A1 | 8/2008 | Shiu et al. |

(Continued)

OTHER PUBLICATIONS

Kim, et al., "LAPWin: Location-Aided Probing for Protecting User Privacy in Wi-Fi Networks", Carnegie Mellon University.

*Primary Examiner* — Phirin Sam
(74) *Attorney, Agent, or Firm* — Kilpatrick Townsend & Stockton LLP

(57) ABSTRACT

Wireless user device probe data can be used to infer or determine an attribute of a user. The probe data can be captured by a sensor device from probes wirelessly transmitted by the user device to search for wireless access points. The probe data can include network addresses of the wireless access points to which the user device has wirelessly connected. The probe data can also include connection information about wireless links between the user device and the wireless access points. The probe data and a user device identifier can be transmitted to a computing device that can compare the probe data to access point network addresses associated with attributes in an electronic data store to determine an attribute for a user of the user device.

20 Claims, 6 Drawing Sheets

(56) References Cited

U.S. PATENT DOCUMENTS

| | | | |
|---|---|---|---|
| 2010/0124881 A1 | 5/2010 | Uppunda et al. | |
| 2012/0076072 A1* | 3/2012 | Jalfon | H04W 12/02 370/328 |
| 2014/0150049 A1 | 5/2014 | Kwon et al. | |
| 2015/0204964 A1* | 7/2015 | Hirano | G01S 5/12 370/252 |
| 2015/0358902 A1* | 12/2015 | Edge | H04W 48/16 370/328 |
| 2016/0112935 A1* | 4/2016 | Ahuja | H04W 48/16 370/338 |
| 2016/0128021 A1* | 5/2016 | Wadhawan | H04W 76/10 370/312 |
| 2016/0212697 A1* | 7/2016 | Jung | H04W 48/16 |
| 2017/0064614 A1* | 3/2017 | Sedlacek | H04W 48/14 |
| 2017/0126491 A1* | 5/2017 | Oedlund | H04L 41/0806 |
| 2017/0353919 A1* | 12/2017 | Derham | H04L 61/6081 |
| 2018/0014271 A1* | 1/2018 | Worsfold | H04W 64/00 |
| 2018/0092011 A1* | 3/2018 | Lin | H04W 12/06 |

\* cited by examiner

DETERMINING ATTRIBUTES USING CAPTURED NETWORK PROBE DATA IN A WIRELESS COMMUNICATIONS SYSTEM

TECHNICAL FIELD

The present disclosure relates generally to wireless communication systems and, particularly but not necessarily exclusively, to determining attributes using network probe data captured by a wireless sensor device.

BACKGROUND

Wireless communication networks, such as WiFi networks, include access points that can wirelessly communicate with user devices via a wireless communication link. A user device can search for access points and establish a communication link with a selected access point. The user device can store information about the access point for subsequently establishing the communication link with the access point more easily. For example, the user device can transmit a probe to search for the access point and automatically include password information to establish a future communication link with the access point. Except for the user device, access point probe data is difficult to use because it often is specific to a particular user device and includes information that is difficult to interpret and use independent of other data that can be equally difficult to obtain.

SUMMARY

In one example, a sensor device includes a network communications port, a processor, and a memory device. The processor can control data communicated through the network communications port. The memory includes instructions that are executable by the processor to cause the sensor device to capture probe data from a user device about probes wirelessly transmitted by the user device to search for wireless access points. The probe data includes (i) network addresses of the wireless access points to which the user device has wirelessly connected and (ii) connection information about wireless links between the user device and the wireless access points. The instructions can also be executable by the processor to cause the sensor device to transmit the probe data and a user device identifier to a computing device configured to compare the probe data to access point network addresses associated with attributes in an electronic data store to determine an attribute for a user of the user device.

In another example, a method includes capturing, by a sensor device, probe data from a user device about probes wirelessly transmitted by the user device to search for wireless access points. The probe data includes (i) network addresses of the wireless access points to which the user device has wirelessly connected and (ii) connection information about wireless links between the user device and the wireless access points. The method can also include transmitting the probe data and a user device identifier to a computing device configured to compare the probe data to access point network addresses associated with attributes in an electronic data store to determine an attribute for a user of the user device.

In another example, a non-transitory computer-readable storage medium includes instructions that are executable by a processor to receive probe data from a user device about probes wirelessly transmitted by the user device to search for wireless access points. The probe data includes (i) network addresses and physical locations of the wireless access points to which the user device has wirelessly connected and (ii) connection information about wireless links between the user device and the wireless access points. The instructions can also be executable by the processor to transmit the probe data and a user device identifier to a computing device configured to compare the probe data to access point network addresses associated with attributes in an electronic data store to determine an attribute for a user of the user device.

The details of one or more aspects and examples are set forth in the accompanying drawings and the description below. Other features and aspects will become apparent from the description, the drawings, and the claims.

DETAILED DESCRIPTION

Figure 1:
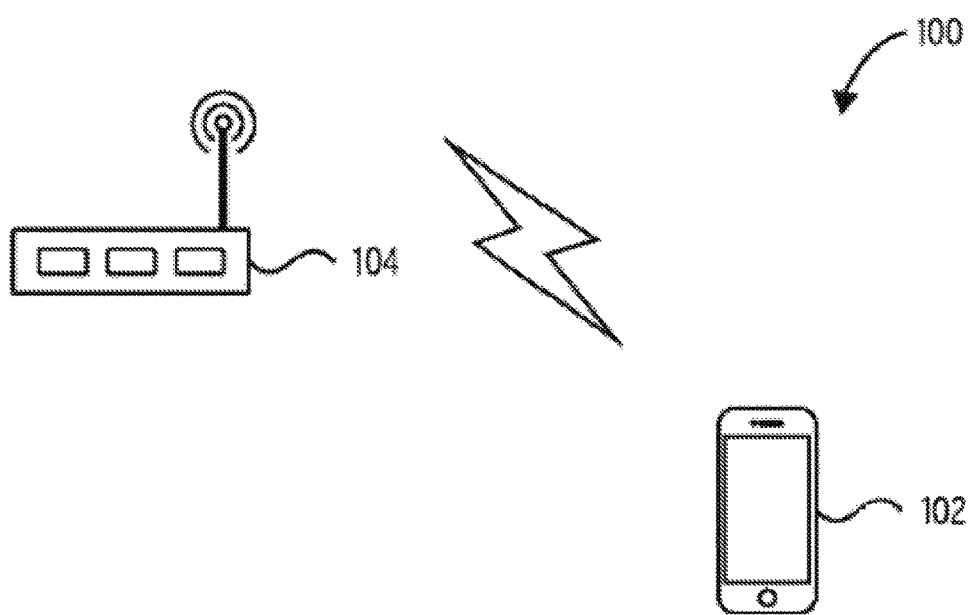
FIG. 1 is a diagram of a wireless communication environment in which a user device can wirelessly connect to an access point according to one example of the present disclosure.

Certain aspects and features of the present disclosure relate to using probe data captured from a user device by a sensor device and data stored about access points to infer or determine an attribute for the user by analyzing the probe data with respect to the data stored about the access points. By using historical access point connection information captured without knowledge of either the user device or the access point, an affinity of the user can be inferred based on comparing the historical access point information with stored, known data about access points and associated attributes.

In one example, the relative security risk of a user may be inferred or determined using the probe data. A sensor device can be positioned in a public location, for example, and the sensor device can capture probe data wirelessly transmitted by the user device without the user device knowing that the sensor device is capturing the probe data. The probe data can be compared to a data store with network addresses of access points or otherwise analyzed to determine whether the user poses a security risk. For example, the user may have spent time wirelessly connected to access points at locations known to have users of high security risk (e.g., suspected terrorists) or the user may have spent an unusually large amount of time proximate to a security target—e.g., banks, gathering locations of targeted individuals, etc.—and that is unusual for the user based on the prior access point connections. Alerts and other notifications may be outputted accordingly.

Probe data can include network address (e.g., media access control (MAC) address) of the access point, physical location, name of the access point, etc. Physical location data can be actual location of an access point or data from which a location or an approximate location can be derived solely from the data of using the data and third-party data sources. For example, the physical location data may be an identifier used to search a database of collected SSID and location data to correlate the location data to the access point. Probe data can also include connection information, which can include the date and time at which the user device established a wireless link with the particular access point and the amount of time that the user device was wirelessly connected to the access point or was proximate to the access point. The amount of time may be an actual amount of time or data from which an amount of time can be derived from, for example, data about repeated communications from the user device in the form of probes or packets as it connects and communicates to a nearby access point.

The sensor device can include an antenna and a demodulator that can capture radio frequency signals that contain probe data from the user device and demodulate the signals to extract the probe data. The sensor device may also include a telecommunications port and a transmitter that can transmit via a telecommunications protocol (e.g., cellular, WiFi, packetization protocols, etc.) the probe data to a processing device for further processing. In other example, the sensor device includes a processor that can execute an application to analyze the probe data. The sensor device may be positioned on a utility pole or other stationary structure, a blimp, a drone, or other mobile structure, or the sensor device may be implemented in a separate user device that is mobile with the another user.

In some examples, the probe data are 802.11 probes that are analyzed using existing data, accumulated learned data, or created metadata, to derive potential affinity among data points. One implementation may be for human surveillance, such as being deployed widely in areas where people congregate and that can aid in early identifying and predicting potential terrorist activity or other bad actors. Collecting and using readily available information and its subsequent analysis may be more powerful than facial recognition in that a device may disclose a history of affiliation beyond the current identification and location that can be derived from facial recognition as a surveillance method. In some aspects, the sensor device may not need to have any special software or hardware to use 802.11 WiFi.

Human security in public places is emerging as a significant concern globally as malevolent acts are perpetrated on people, most often in locations where unsuspecting people congregate. Society is looking for ways to identify perpetrators, or to assess heightened danger levels, before these acts can be carried out. In many cases, perpetrators have been involved in associations with known bad actors and known locations, but there has not been a way to tie together the location of a bad actor with a location of a concentration of known bad actors in time to take actions for preventing and mitigating potential bad acts. Using some examples of the sensor device and data store, a user device's historical affiliation may be used to derive relationships that may be predictive of risk, and provide an opportunity for analysis and potential preventive action before a malevolent event or injury occurs.

A sensor device according to some examples can be a hardware device or a software instance on an existing device and used to monitor network probes (e.g., signals used by a user device to search for connections with specific service set identifiers (SSIDs)). The sensor device can then associate the probe data to a real or representative identifier of the probing entity with the collection point (and likely its actual location or identity), and communicate that information to a separate processing device for collection and comparison to other data to determine affinity to details of specific interest. The other data can be of various forms, examples of which include a database of known SSIDs, a database of interesting SSIDs, a database of derived affinities for known SSIDs (developed and derived from other data sources such as geo-location). Collecting probe data (e.g., affinity information) and subsequent comparing the probe data to known information may be used to derive inferences using a variety of logical relationships and data analysis. These types of data collections can provide for fast and efficient analysis, potentially permitting rapid identification of risk with the potential for quick, effective action to prevent bad acts. The sensor device may be one of multiple sensor devices forming a sensor device network that can communicate data to a centralized collection point to organize, collect, and store information centrally, where processing speed, storage, and security controls can be available. In the case of homeland security or a similar security entity, a centralized location and control over security and secrecy of the database can be an effective deployment strategy. For example, by having centralized processing, the sensor device can be relieved from the burden of storage or processing associated with the database and analysis functions.

One benefit of some examples of the present disclosure is an early warning capability, similar in some ways to an IP network's intrusion detection system or intrusion prevention system that may offer an alert or take an action to prevent an identifiable potential threat. A sensor device can be deployed as a standalone probe monitoring point, or multiple points, or be incorporated into a larger surveillance capability or as a feature of a related network appliance that supports 802.11 WiFi. By collecting probe information and associating the probe information to specific devices and locations, new relationships may be inferred from the aggregated information. Information aggregation and subsequent analysis can offer the opportunity to create deeper inferences that may be useful in identifying potential risks and threats.

Although examples of implementations are described above with respect to inferring or determining security threats, different or additional attributes about a user of a user device can be inferred or determined. For example, an affinity for the user to frequent certain physical locations can be used to connect the user to other users that may share common interests or have a business connection. In other examples, business opportunities can be presented to the user based on the user's affinity for certain physical locations that are associated with businesses interested in further deepening a business relationship. Furthermore, access points may be one or more different types of access points. Examples include WiFi access points, Bluetooth® access points, ZigBee access points, etc.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

FIG. 1 is a diagram of a wireless communication environment 100 in which a user device 102 can wirelessly connect to an access point 104 according to one example of the present disclosure. The user device 102 can establish a wireless communication link with the access point 104 to exchange data, access other networks, such as the Internet, and otherwise perform communications. The user device 102 may transmit a password or provide some other credential to establish the wireless link. In other examples, no password or credential is required for the user device 102 to establish the wireless link.

The user device 102 can store information about the access point 104 in local memory. Examples of the information include the communication channel over which the wireless communication link is established, network name for the access point 104, and MAC or other network address for the access point 104. The physical location of the access point 104 may also be derived or received by the user device 102 and stored.

Examples of the user device 102 include a mobile telephone, a tablet PC, a laptop, and a personal digital assistant. The access point 104 can allow the user device to connect to a wired network, such as the Internet, and include or be coupled to a wireless router. In additional examples, the access point 104 may communicatively couple to the user device via a wired communication medium.

Figure 2:
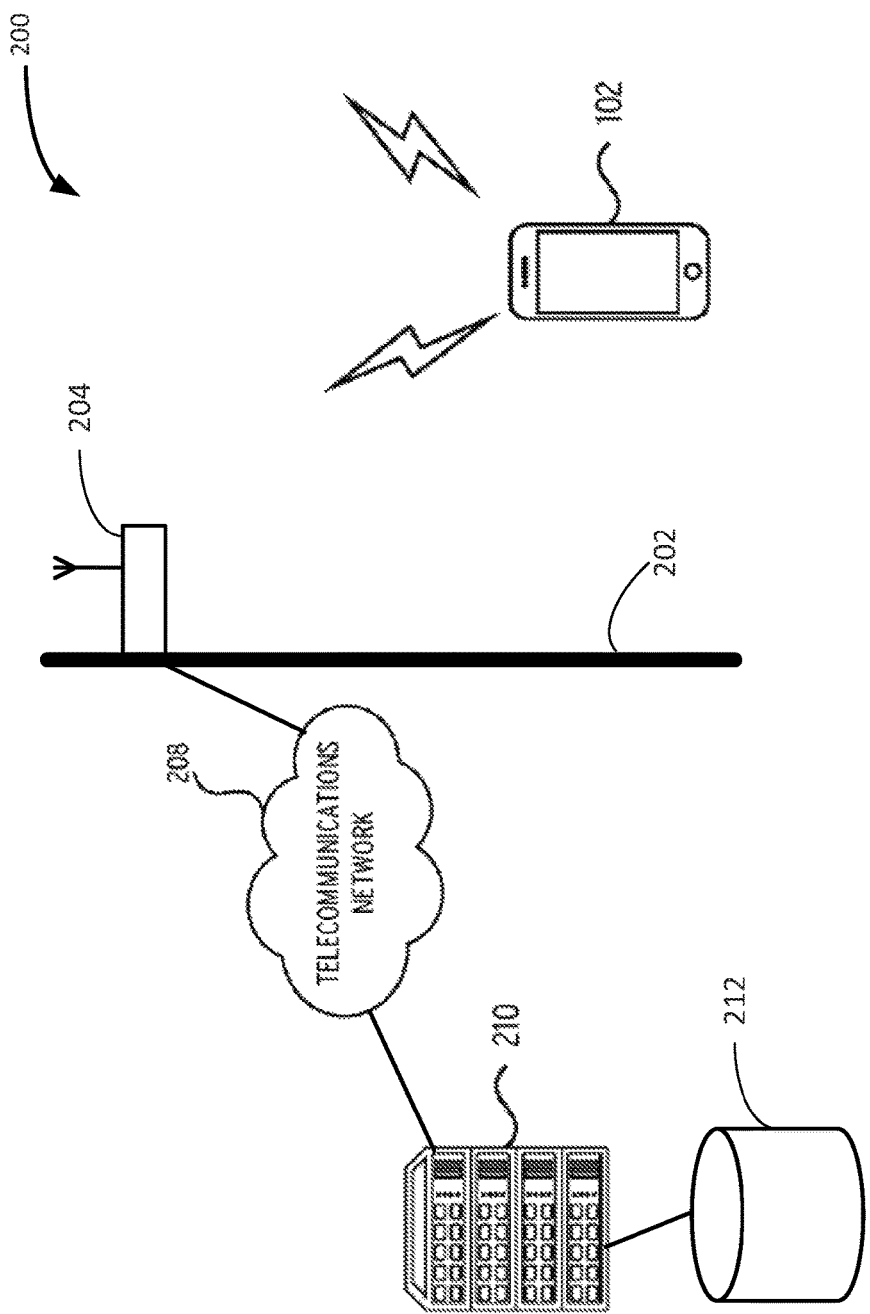
FIG. 2 is a diagram of a wireless communication environment in which a sensor device can capture access point probe data from a user device according to one example of the present disclosure.

FIG. 2 is a diagram of a wireless communication environment 200 in which a sensor device 204 can capture access point probe data from the user device 102 according to one example of the present disclosure. The environment 200 may be subsequent in time to the environment 100 FIG. 1. The user device 102 may be wirelessly transmitting probe data to search for access points, such as access point 104 from FIG. 1, to which the user device 102 has previously connected. The sensor device 204 can wirelessly detect the probe data from the user device 102 and be separate and independent from any wireless access point or user device.

The sensor device 204 in FIG. 2 is positioned on a structure 202, which may be a utility pole, part of a building, a tree, or any type of structure that can allow the sensor device 204 to capture signals that include probe data from user devices, such as user device 102, in a coverage area. The probe data can include name, network address, and potentially other information about access points to which the user device 102 has previously connected. The probe data may also include connection information that includes data about the wireless communication links previously established by the user device 102 to access points. Examples of probe data include SSID, Bluetooth Low-Energy (BLE) beacons, location information, time information, device information, sensor information, and site-specific information.

The sensor device 204 can capture the probe data and transmit the probe data to a computing device 210, which can be a server, through a telecommunication network 208. The computing device 210 can include or be coupled to a database 212 that includes data with respect to which the probe data can be analyzed to infer or determine an attribute of the user. By capturing probe data and analyzing the probe data with respect to stored information, network traffic and information can be used to infer or determine attributes about users without proactively involving the user or access points.

The telecommunications network 208 can be a wired network, a wireless network, or a combination of one or more wired networks and wireless networks. Examples of the telecommunications network 208 include a cellular network, a telecommunications backhaul, a cellular telecommunications network backhaul, a WiFi mesh network, a distributed antenna system, and an Ethernet network.

In some examples, the sensor device 204 is an access point, or is part of an access point, that can also establish a wireless communications link with the user device 102 to allow the user device 102 to communicate with a wired network. The database 212 can be a relational database, blockchains, centralized database, distributed database, and other types of databases. The database 212 can be implemented in a non-transitory computer-readable medium that includes logic and hardware capable of storing electronic code that represents data and relationships between data.

Figure 3:
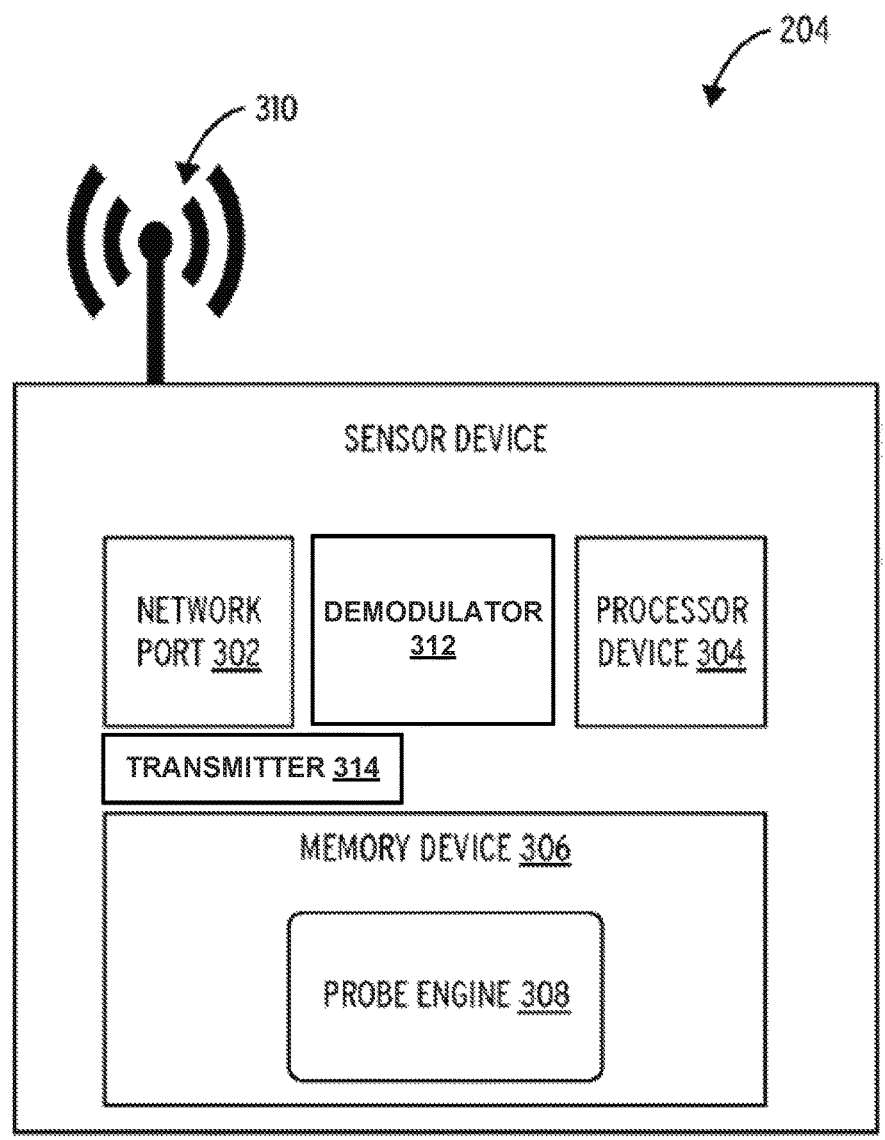
FIG. 3 is a block diagram of a sensor device according to one example of the present disclosure.

FIG. 3 is a block diagram of the sensor device 204 according to one example of the present disclosure. The sensor device 204 includes a network port 302, a processor device 304, a memory device 306, and an antenna 310. The antenna 310 can be integrated with the sensor device 204, or the antenna 310 can be coupled to the sensor device 204 through an antenna port (not shown). The antenna 310 can capture signals from user devices that include probe data.

Also included in the sensor device 204 are a demodulator 312 and a transmitter 314. The demodulator 312 can demodulate signals captured by the antenna 310 to extract probe data in the captured signals. The transmitter 314 can modulate or transmit the probe data in a proper communication protocol through the network port 302 to a telecommunications network for receipt by a processing device. Examples of the network port 302 include a network interface card, or physical layer circuitry, that can allow signals to be communicated to the telecommunications network. A sensor device according to other examples may not include a demodulator and instead retransmit the captured signals onto the telecommunications network for receipt by a processing device.

Non-limiting examples of the processor device 304 include a Field-Programmable Gate Array (FPGA), an application-specific integrated circuit (ASIC), a microprocessor, etc. The processor device 304 can execute one or more operations for managing probe data capturing and transmitting the probe data to a telecommunications network. The processor device 304 can execute instructions stored in the memory device 306 to perform the operations. In some examples, the instructions can include processor-specific instructions generated by a compiler or an interpreter from code written in any suitable computer-programming language, such as C, C++, C#, etc.

Non-limiting examples of the memory device 306 include electrically erasable and programmable read-only memory (EEPROM), flash memory, or any type of non-volatile memory. In some examples, at least some of the memory devices 306 can include a medium from which the processor device 304 can read instructions. A computer-readable medium can include electronic, optical, magnetic, or other non-transitory storage devices capable of providing the processor device 304 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions.

The memory device 306 can include instructions such as a probe engine 308 that can be executed by the processor device 304 for performing various operations in managing the sensor device 204 in capturing and transmitting probe data. For example, the probe engine 308 can be executed by the processor device 304 to control the demodulator 312 and the transmitter 314, or otherwise control when the sensor device 204 captures signals that can include probe data. The probe engine 308 can also be executed to prevent the sensor device 204 from being attacked by malicious signals in an attempt to subvert the functions of the sensor device 204 by instructing the sensor device 204 to filter signals from an identified source or with certain types of data. In some examples, the functions of the demodulator 312 and the transmitter 314 are implemented as instructions in the memory device 306 that can be executed by the processor device 304, rather than being separate components of the sensor device 204. In addition, the sensor device 204 may store captured probe data in the memory device 306.

Figure 4:
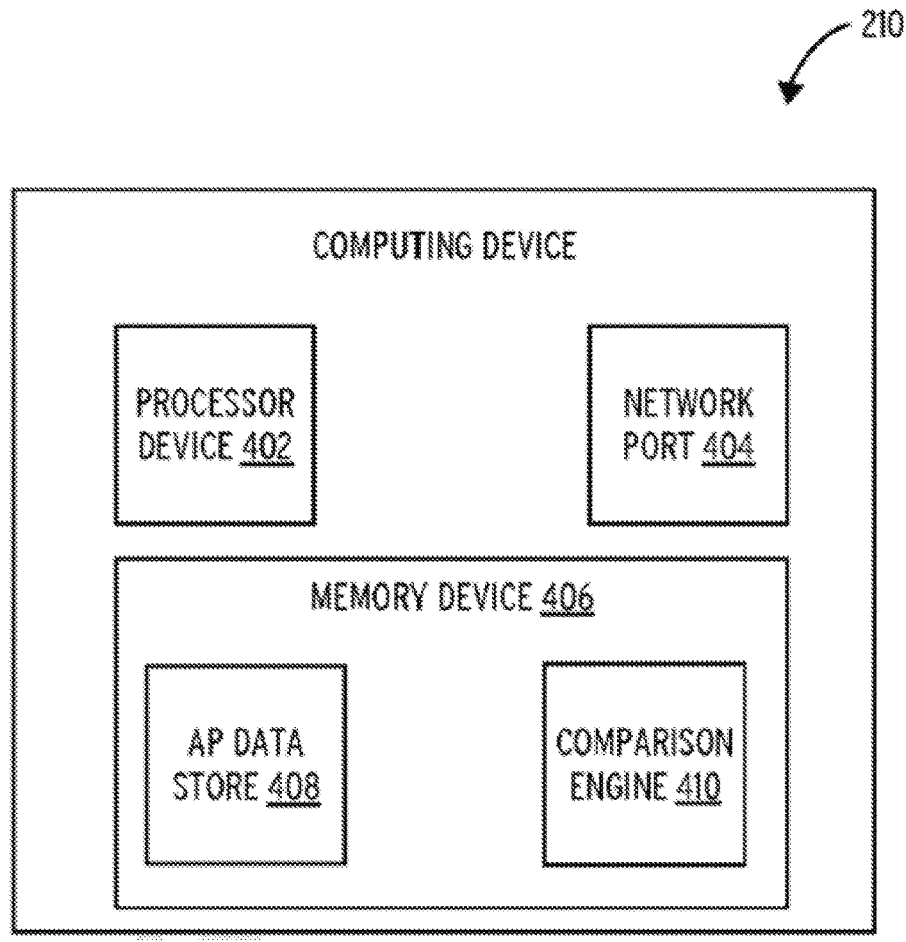
FIG. 4 is a block diagram of a computing device usable to analyze captured access network probe data according to one example of the present disclosure.

FIG. 4 is a block diagram of the computing device 210 usable to analyze captured access network probe data according to one example of the present disclosure. The computing device 210 includes a processor device 402, a network port 404, and a memory device 406. Examples of the processor device 402 and the memory device 406 include the same or similar examples as the processor device 304 and the memory device 306 of FIG. 3. The network port 404 may similarly be a network interface card, physical layer circuitry, or other type of circuitry to interface with a telecommunications network to receive probe data from a sensor device. The memory device 406 can include instructions as an access point data store 408 and a comparison engine 410. The access point data store 408 may, in other examples, be implemented as a separate database or in a separate device than the computing device. The access point data store 408 includes information about access points and associated attributes collected or received from various sources, including previously received probe data.

The comparison engine 410 can be executed by the processor device 402 to perform analytics on the received probe data and the information in the access point data store to determine an attribute. The comparison engine 410 may also be executed by the processor device 402 to output alerts or information to a display for a user or a separate system or application to take action on the probe data received from the sensor device.

Figure 6:
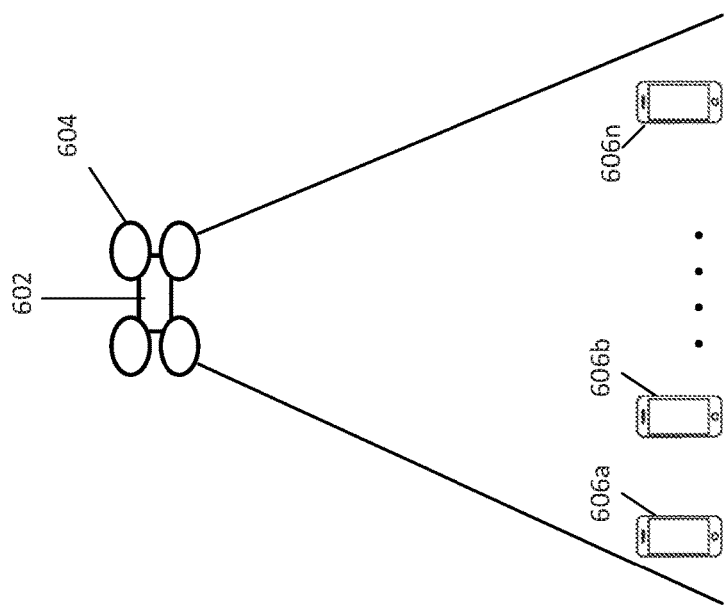
FIG. 6 is a diagram of an implementation of a sensor device with a drone according to one example of the present disclosure.
Figure 5:
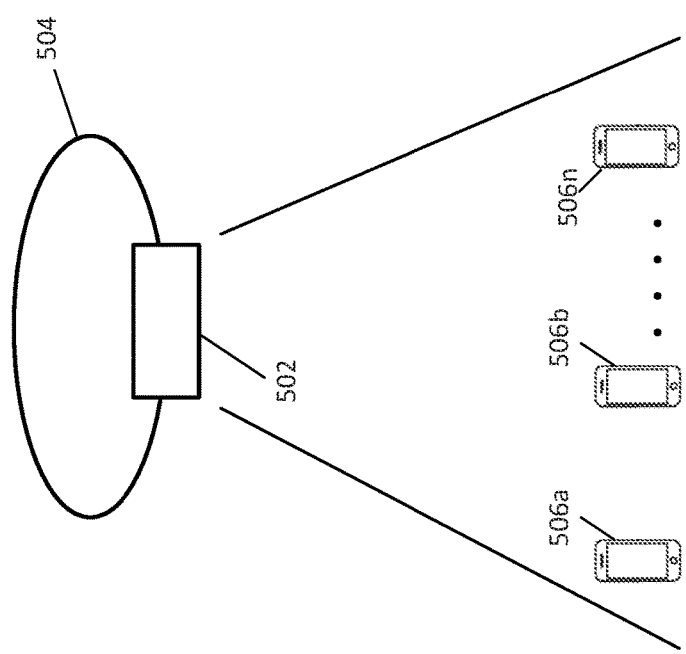
FIG. 5 is a diagram of an implementation of a sensor device with a blimp according to one example of the present disclosure.

A sensor device according to various examples can be positioned on various types of structures to capture probe data from user devices. FIGS. 5 and 6 depict examples of aerial structures that can be used. FIG. 5 is a diagram of an implementation of a sensor device 502 with a blimp 504 according to one example of the present disclosure. The blimp 504 can be flown to a coverage area where, for example, a concentration of users with user devices 506a-n are located to capture a large amount of probe data, as compared for example to a sensor device positioned on a utility pole.

FIG. 6 is a diagram of an implementation of a sensor device 602 with a drone 604 according to one example of the present disclosure. The drone 604 can be flown to a coverage area where a concentration of users with user devices 606a-n is located to capture probe data from the user devices 606a-n.

Figure 7:
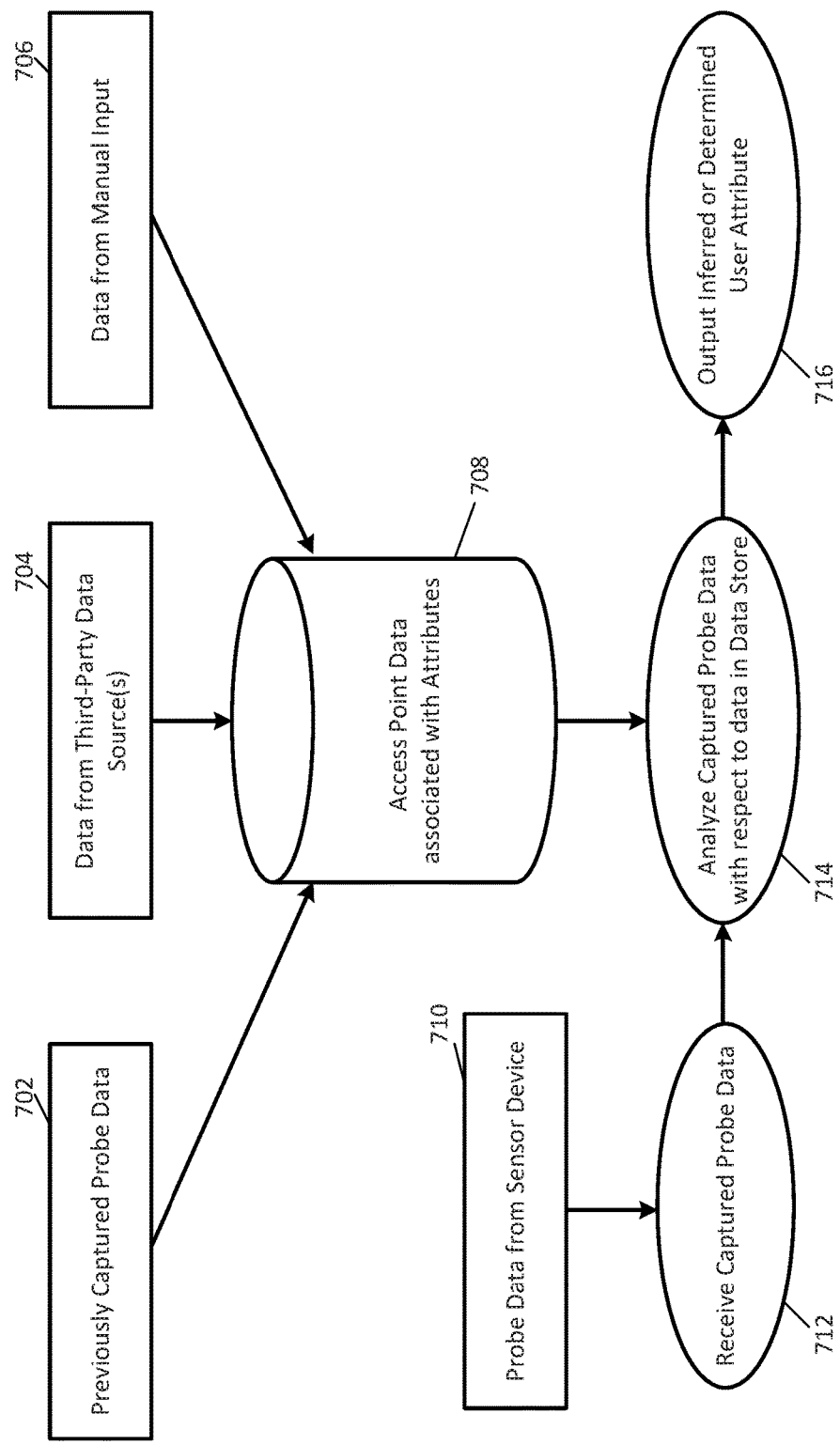
FIG. 7 is a data flow diagram for a computing device in generating a data store and analyzing captured probe data with respect to data in the data store according to one example of the present disclosure.

FIG. 7 is a data flow diagram for a computing device in generating a data store 708 and analyzing captured probe data with respect to data in the data store 708 according to one example of the present disclosure. The data flow can include processes performed by the computing device 210 of FIG. 2, but other implementations are possible.

The computing device can generate the data store 708 with access point data associated with attributes in it by receiving data from one or more sources and storing the data in a manner that can be analyzed with respect to subsequently received data. Examples of sources of data include previously captured probe data 702, data from third-party data sources 704, and data from manual input 706.

Previously captured probe data 702 can include data about access points, and information associated with those access points, previously captured by a sensor device and received by the computing device. The information associated with those access points may include information about the user or the user device that connected to the access points, geographic information about the access points. From this information, the computing device may be able to formulate an attribute value for an access point. For example, the computing device may automatically associate an access point with a high security risk if enough users that are themselves a high security risk (e.g., the computing device can compare to a list of high security risk users) have connected to the access point. In other examples, the previously captured probe data may be associated with an attribute that results from analysis of the probe data with respect to data already stored in the data store 708.

Data from third-party data sources 704 can include any type of data and can be from any source. Examples can include government data sources and private enterprise sources that can include MAC addresses and physical location information about access points. The data may also include attributes, such as a list of access points located in highly suspicious physical locations known to be frequented by users of interest. The data can be received by any transmission protocol. Examples include receiving the data via Internet Protocol and via a telecommunications backhaul link. In other examples, the data from the third-party data sources 704 can be caused to be received by the data store 708 via an instruction by an administrator or other person that controls the data store 708.

The data from manual input 706 can be data that is received by the data store 708 as a result of manual data input by a human, such as a person that controls the data store 708. In some examples, the data store 708 includes data that is the result of a combination of these or other sources. For example, data from third-party data sources 704 can be supplemented with data from manual input 706 to generate a comprehensive database that is usable to analyze captured probe data.

The probe data from a sensor device 710 can be received by the computing device in process 712. The computing device can analyze the captured probe data with respect to data in the data store in process 714. The computing device can determine an attribute to associate with the captured probe data by comparing the probe data to the data in the data store 708. For example, the computing device may determine that the user device was connected an unusually long time to an access point and the access point may be located at a sensitive location—e.g., proximate to an airport, club, or other location where people congregate—and there is no reasonable explanation for why the user device was connected so long to the access point except for suspicious activity—e.g., a user that is "casing" a particular location for a bad act. In another example, the computing device can determine that a user device was connected to multiple access point that, together, suggest that the user may be about to commit a bad act. Being connected to each access point individually may not suggest there is a risk with the individual, but being connected to an access point to which bad actors (in addition to non-bad actors) are known to connect and being connected to another access point that is located in a sensitive area may indicate that the user of the user device should be associated with a high risk attribute.

In some examples, the data in the data store 708 can be filtered by certain criteria such that the captured probe data is analyzed with respect to the filtered data, rather than the entire data store 708. For example, the data in the data store 708 can be filtered to result in data about access points associated with known high security risks and the probe data can be compared against the filtered data.

The computing device, after analyzing the probe data, can output an inferred or determined user attribute in process 716. The attribute may be outputted in the form of an alert to the proper personnel, or in batch form in the normal course of processing. In other examples, the attribute may only alert personnel if the attribute meets certain criteria— e.g., high risk, should be further investigated, indicates the user has a need for a certain service or business connection, etc. After outputting the alert or other result of the analysis, the computing device may add the probe data to the data store 708.

The foregoing description of the examples, including illustrated examples, of the subject matter has been presented only for the purpose of illustration and description and is not intended to be exhaustive or to limit the subject matter to the precise forms disclosed. Numerous modifications, adaptations, and uses thereof will be apparent to those skilled in the art without departing from the scope of this subject matter. The illustrative examples described above are given to introduce the reader to the general subject matter discussed here and are not intended to limit the scope of the disclosed concepts.

What is claimed is:

1. A sensor device comprising:
   a network communications port;
   a processor configured to control data communicated through the network communications port; and
   a memory device having instructions that are executable by the processor to cause the sensor device to:
      capture probe data from a user device about probes wirelessly transmitted by the user device to search for wireless access points, the probe data including (i) network addresses of the wireless access points to which the user device has wirelessly connected prior to attempting a current connection to a wireless access point by wirelessly transmitting the probe data and (ii) connection information about wireless links between the user device and the wireless access points to which the user device has connected prior to attempting the current connection to the wireless access point; and
      transmit the probe data and a user device identifier to a computing device configured to compare the probe data to access point network addresses associated with attributes in an electronic data store to determine an attribute for a user of the user device.

2. The sensor device of claim 1, wherein the probe data includes Service Set Identifiers (SSIDs) for the wireless access points to which the user device has previously wirelessly connected and time data from the connection information and that is associated with the connection between the user device and the wireless access points, the wireless access points being WiFi access points, wherein the user device identifier is a media access control (MAC) address for the user device, wherein the attributes include relative security risks for the wireless access points that are based on security threats of users previously identified within coverage areas of the wireless access points or are based on security threats associated with physical locations associated with the wireless access points.

3. The sensor device of claim 2, wherein the instructions are further executable to cause the sensor device to:
   designate at least one attribute as a high security risk; and
   analyze the electronic data store by:
      identifying the access point network addresses that are associated with the high security risk;
      comparing the access point network addresses associated with the high security risk to the probe data to determine a match of a network address or a physical location to at least one access point network addresses that is associated with the high security risk; and
      outputting an alert about the user in response to determining the match; and
   add the probe data to the electronic data store as additional access point network addresses associated with the attributes.

4. The sensor device of claim 1, wherein the instructions are executable by the processor to cause the sensor device to transmit the probe data and the user device identifier by transmitting the probe data and the user device identifier from the sensor device through a cellular communications network backhaul for receipt by the computing device, the sensor device being positionable on a tower, a utility pole, or an aerial object.

5. The sensor device of claim 1, wherein the sensor device is separate and independent from any wireless access point and from the user device, the attribute for the user being determinable from network activity with respect to the wireless access points.

6. The sensor device of claim 1, wherein the connection information includes a date and time at which the user device connected to a wireless access point and an amount of time that the user device connected to the wireless access point.

7. The sensor device of claim 1, further comprising:
   an antenna configured to detect wireless signals in multiple channels from the user device;
   a demodulator configured to demodulate the wireless signals to extract the probe data from the wireless signals; and
   a transmitter configured to modulate the probe data on signals for transmission to the computing device via a communications protocol different than the communications protocol of the wireless signals detected by the antenna.

8. A method comprising:
   capturing, by a sensor device, probe data from a user device about probes wirelessly transmitted by the user device to search for wireless access points, the probe data including (i) network addresses of the wireless access points to which the user device has wirelessly connected prior to attempting a current connection to a wireless access point by wirelessly transmitting the probe data and (ii) connection information about wireless links between the user device and the wireless access points to which the user device has connected prior to attempting the current connection to the wireless access point; and transmitting the probe data and a user device identifier to a computing device configured to compare the probe data to access point network addresses associated with attributes in an electronic data store to determine an attribute for a user of the user device.

9. The method of claim 8, wherein the probe data includes Service Set Identifiers (SSIDs) and physical locations for the wireless access points to which the user device has previously wirelessly connected and time data from the connection information and that is associated with the connection between the user device and the wireless access points, the wireless access points being WiFi access points, wherein the user device identifier is a media access control (MAC) address for the user device, wherein the attributes include relative security risks for the wireless access points that are based on security threats of users previously identified within coverage areas of the wireless access points or are based on security threats associated with physical locations associated with the wireless access points.

10. The method of claim 9, further comprising:
designating at least one attribute as a high security risk; and
analyzing the electronic data store by the computing device:
identifying the access point network addresses that are associated with the high security risk;
comparing the access point network addresses associated with the high security risk to the probe data to determine a match of a network address or a physical location to at least one access point network addresses that is associated with the high security risk; and
outputting an alert about the user in response to determining the match; and
adding the probe data to the electronic data store as additional access point network addresses associated with the attributes.

11. The method of claim 8, wherein transmitting the probe data and the user device identifier comprises transmitting the probe data and the user device identifier from the sensor device through a cellular communications network backhaul for receipt by the computing device, the sensor device being positioned on a tower, a utility pole, or an aerial object.

12. The method of claim 8, wherein the sensor device is separate and independent from any wireless access point and from the user device, the attribute for the user being determined from network activity with respect to the wireless access points.

13. The method of claim 8, wherein the connection information includes a date and time at which the user device connected to a wireless access point and an amount of time that the user device connected to the wireless access point.

14. The method of claim 8, wherein capturing, by the sensor device, probe data from the user device about the probes wirelessly transmitted by the user device to search for the wireless access points comprises:
detecting, by an antenna of the sensor device, wireless signals in multiple channels from the user device;
demodulating, by a demodulator of the sensor device, the wireless signals to extract the probe data from the wireless signals; and
storing the probe data electronically in a computer-readable medium of the sensor device.

15. A non-transitory computer-readable storage medium including instructions that are executable by a processor to:
receive probe data from a user device about probes wirelessly transmitted by the user device to search for wireless access points, the probe data including (i) network addresses of the wireless access points to which the user device has wirelessly connected prior to attempting a current connection to a wireless access point by wirelessly transmitting the probe data and (ii) connection information about wireless links between the user device and the wireless access points to which the user device has connected prior to attempting the current connection to the wireless access point; and
transmit the probe data and a user device identifier to a computing device configured to compare the probe data to access point network addresses associated with attributes in an electronic data store to determine an attribute for a user of the user device.

16. The non-transitory computer-readable storage medium of claim 15, wherein the probe data includes Service Set Identifiers (SSIDs) for the wireless access points to which the user device has previously wirelessly connected and time data from the connection information and that is associated with the connection between the user device and the wireless access points, the wireless access points being WiFi access points, wherein the user device identifier is a media access control (MAC) address for the user device.

17. The non-transitory computer-readable storage medium of claim 16, wherein the instructions are further executable to:
designate at least one attribute as a high security risk; and
analyze the electronic data store by:
identifying the access point network addresses that are associated with the high security risk;
comparing the access point network addresses associated with the high security risk to the probe data to determine a match of a network address or a physical location to at least one access point network addresses that is associated with the high security risk; and
outputting an alert about the user in response to determining the match; and
add the probe data to the electronic data store as additional access point network addresses associated with the attributes.

18. The non-transitory computer-readable storage medium of claim 15, wherein the instructions are executable to determine or infer the attribute for the user based on network activity detected by a sensor device that is separate and independent from any wireless access point and from the user device.

19. The non-transitory computer-readable storage medium of claim 15, wherein the instructions are further executable to:
demodulate wireless signals in multiple channels received from the user device to extract the probe data from the wireless signals; and
modulate the probe data onto signals transmitted to the computing device.

20. The non-transitory computer-readable storage medium of claim 19, wherein the instructions are further executable to transmit modulated signals including probe data to a cellular communications network for receipt by the computing device.

* * * * *